(12) United States Patent
Saito et al.

(10) Patent No.: US 6,445,096 B1
(45) Date of Patent: Sep. 3, 2002

(54) SPINDLE MOTOR

(75) Inventors: Shoichi Saito, Hachioji; Toru Wakabayashi, Machida, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/999,128

(22) Filed: Oct. 24, 2001

(30) Foreign Application Priority Data

Nov. 20, 2000 (JP) ......................................... 2000-353143

(51) Int. Cl.[7] .......................... H02K 7/14; H02K 11/00; H02K 5/16
(52) U.S. Cl. ................... 310/67 R; 310/156.01; 310/90
(58) Field of Search .................. 310/67 R, 90, 310/156.3, 156.33, 156.34, 156.37, 156.21, 43 R

(56) References Cited

U.S. PATENT DOCUMENTS

| | | | | |
|---|---|---|---|---|
| 4,788,464 A | * | 11/1988 | Nishikawa | 310/268 |
| 4,839,551 A | * | 6/1989 | Tomiswa | 310/90 |
| 5,710,476 A | * | 1/1998 | Ampela | 310/268 |
| 5,834,868 A | * | 11/1998 | Yoshikawa | 310/67 R |
| 6,040,649 A | * | 3/2000 | Horng | 310/91 |
| 6,081,057 A | * | 6/2000 | Tanaka | |
| 6,316,856 B1 | * | 11/2001 | Kusaki | 310/90 |

FOREIGN PATENT DOCUMENTS

JP   8-19236   1/1996

* cited by examiner

Primary Examiner—Tran Nguyen
Assistant Examiner—Iraj A Mohandesi
(74) Attorney, Agent, or Firm—Scully, Scott, Murphy & Presser

(57) ABSTRACT

This spindle motor has a base plate, a stator mounted on the base plate, a bearing provided on the base plate, a rotating shaft rotatably provided on the bearing, and a rotor fixed to the rotating shaft. The rotor is formed of a metallic magnetic substance and resin and is fixed to the rotating shaft at the magnetic substance, and a field magnet fixed to the rotor. The field magnet is pressed into and fixed to the rotor at a resin section of the rotor.

7 Claims, 3 Drawing Sheets

SPINDLE MOTOR

CROSS-REFERENCE TO RELATED APPLICATIONS

This application is based upon and claims the benefit of priority from the prior Japanese Patent Application No. 2000-353143, filed Nov. 20, 2000, the entire contents of which are incorporated herein by reference.

BACKGROUND OF THE INVENTION

Field of the Invention

The present invention relates to a spindle motor for driving a disk, polygon mirror, etc. More specifically, the present invention concerns an attachment technique associated with a configuration of a spindle motor for improving accuracy of a rotor.

In recent years, there are increasing demands for low-profile and low-cost motors for driving disks or polygon mirrors. Furthermore, as the density and speed of disks are increased, the accuracy of the disk-mounting surface must be improved, rotational irregularities must be ironed-out, and vibration noise must be reduced.

The requirements of high rotational speed, high reflective accuracy of the polygon mirrors, and low vibration noise have placed tough demands on the polygon mirror mounting surface. To meet these demands, a sliding bearing is used to reduce costs, whilst a hydrodynamic bearing is used for high accuracy, high speed and cost reduction.

Therefore, the major problems of improving the accuracy, decreasing vibration noise and rotational irregularities in polygon mirror or disk-driving motors need to be overcome, whilst also satisfying the demands of cost-reduction and the motor to be made lower-profile. As a solution to the above problems of accuracy and vibration, Jpn. Pat. Appln. KOKAI publication No. 8-19236 proposes the following:

The flat-type brushless motor described in Jpn. Pat. Appln. KOKAI Publication No. 8-19236 comprises a rotor hub, a rotor yoke, and a field magnet. A rotation shaft is pressed into the motor rotor. The rotor yoke is caulked to the rotor hub. A plurality of positioning protrusions is formed by pressing a rotor yoke's substrate for mounting a flat surface of the field magnet. The field magnet slides on the substrate and moves between positioning protrusions. After positioning is complete, an outer periphery of the field magnet is fixed by means of adhesive.

A circular wall is formed at an external wall on the substrate of the rotor yoke. Inside this circular wall, an inside diameter is formed by the positioning projection. In the inside diameter, the field magnet's outside diameter and plane surface directly contact the rotor yoke and are fixed with adhesive.

However, the prior art for motors proposing the aforementioned configuration and mounting technique presents the following problems due to parts and positioning inaccuracies. For example, a part called a rotor yoke is installed between the field magnet and a rotating shaft working as a rotation center of the field magnet. The sum total of the inaccuracies inevitably increases the eccentricity. Generally, a field magnet is fabricated by sintering magnetic powder. Due to this, field magnets are fragile and break easily. When the field magnet is assembled by sliding on the substrate until positioned at positioning protrusions of the rotor yoke, the field magnet is positioned to one side of a gap between the magnet and the positioning protrusion.

Generally, a rotor yoke is formed by pressing. If a specified length or more is ensured between the protrusion and the circular wall, a plastic deformation ratio of the material used increases. It is difficult to precisely form the circular wall and protrusion. In order to ensure a certain accuracy, an outside diameter of the yoke needs to be substantially larger than the field magnet diameter. As a result, the yoke becomes considerably heavy. Further, if eccentricity exists, the rotor balance is greatly affected in addition to the problem of increased weight. The increased vibration noise associated with the above creates a further problem.

Generally, caulkable metal is used as a material for a rotor hub caulking the rotor yoke. It is common practice to cut a rotating shaft by chucking in order to form a rotor hub's upper surface with high precision for mounting a polygon mirror, etc. Since a metal is used, machinability is bad, making it difficult to provide the desired precision. Since the mounting surface is thick in the shaft direction, the specific gravity is high and the rotor is heavy. Further, vibration noise increases due to the rotor's eccentricity.

Especially, the length of the rotation shaft and portion pressed into the hub need to be reduced to enable a low-profile motor. However, this reduces the rigidity of the pressed portion. When a polygon mirror mounting surface of the rotor hub is cut, the use of a metal having a large cutting resistance makes it difficult to ensure the desired precision. Consequently, this degrades the accuracy of the polygon mirror's reflective surface.

The field magnet and the rotor yoke are fixed with adhesive after positioning, degrading the workability and increasing costs. The whole of one plane and the outside periphery of the field magnet are directly fixed to the rotor yoke. The rotating shaft is pressed by caulking the rotor yoke and the hub, and is fixed to the base plate via bearings. In this configuration, vibrations caused by the drive torque occur between a stator and the field magnet. This vibration propagates from the field magnet to the base plate, and increases. The rotor yoke, hub, and rotation shaft of the rotor section are made of metal. The field magnet is also made of a semi-ferrous material. This easily causes resonant frequencies approximate to each other.

During operation, there is a possibility that the apparatus housing the above-mentioned drive motor will be dropped. This motor may be provided with bearings such as a sliding bearing or a hydraulic bearing for supporting a shaft, using a thrust pad. In such a case, there is a high possibility that the shock due to the drop causes the rotor to be dismounted. It is therefore necessary to provide low-cost means for preventing disengagement.

As mentioned above, many problems are pointed out as far as the prior art is concerned. The positioning accuracy of the motor components of the prior art is still unsatisfactory. Accordingly, the above problems impose limitations on effective solutions for vibration and noise.

It is therefore an object of the present invention to provide a spindle motor mountable with increased accuracy, together with a field magnet thereof.

BRIEF SUMMARY OF THE INVENTION

In order to solve the above-mentioned problems and achieve the object, the present invention devises the following means. According to one mode, a spindle motor includes a base plate, a stator mounted on the base plate, a bearing provided on the base plate, a rotating shaft rotatably provided on the bearing, and a rotor fixed to the rotating shaft. The rotor is formed of a metallic magnetic substance and resin and is fixed to the rotating shaft at the magnetic substance, and a field magnet fixed to the rotor. The field magnet is pressed into and fixed to the rotor at a resin section of the rotor.

The bearing is a dynamic pressure bearing, including a sleeve and a thrust pad.

The stator includes an auxiliary yoke, and the rotor includes a mounting surface for mounting a disk or a polygon mirror at a resin section.

The rotor includes a rib formed of the resin, and the field magnet touches the rib and forms a gap with a specified distance.

The resin section is placed between the magnetic substance and the field magnet, and the resin section is provided with the rotor forming ribs so that a specified gap is provided between a plane of the field magnet and the resin section.

The present invention aims at decreasing the resonance and vibration noise by using the very low vibration transmissibility of resin.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described in detail with reference to the accompanying drawings.

(First Embodiment)

Figure 1:
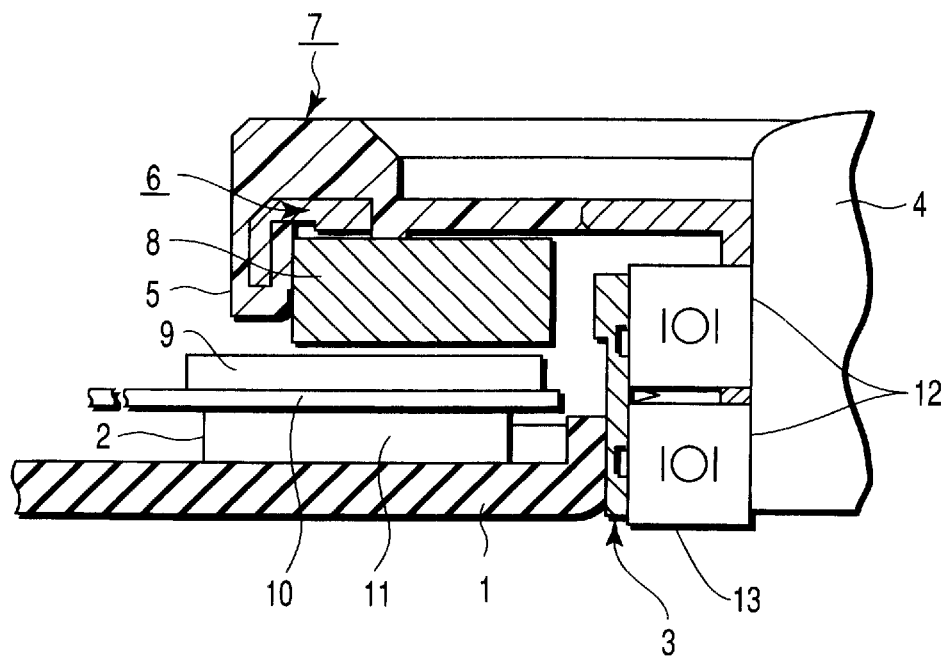
FIG. 1 is a vertical sectional view showing a configuration of a spindle motor as a first embodiment of the present invention.
Figure 2:
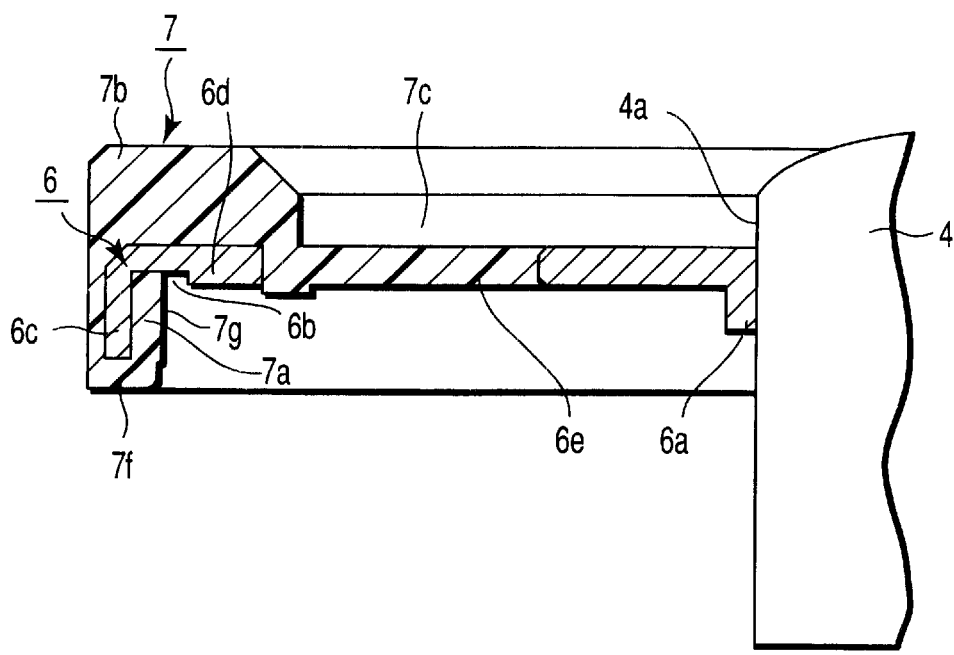
FIG. 2 is a vertical sectional view showing a rotor and a rotating shaft of this spindle motor.

First, the following describes the spindle motor as the first embodiment with reference to FIGS. 1 to 5. FIG. 1 provides a sectional view of the spindle motor structure. FIG. 2 shows an enlarged sectional structure of a rotor 5 and a rotating shaft 4.

In FIGS. 1 and 2, a stator 2 is mounted on a base plate 1 as a base. A bearing 3 is provided near the center of the base so as to support the rotating shaft 4. The rotating shaft 4 is freely mounted on the bearing 3. The rotor 5 is fixed to the rotating shaft 4.

The rotor 5 uses a metallic magnetic substance and resin. The rotating shaft 4 is pressed into a fixing section 6a for fixing the rotating shaft 4 on a metallic magnetic rotor yoke 6, absorptively fixing a shaft direction of a field magnet 8. A hub 7 is formed of resin integrally with the yoke 6 to fix a radial direction of the field magnet 8 by pressing. The rotor 5 is rotated by a magnetic flux generated between the field magnet 8 and the stator 2.

The stator 2 comprises a coil 9, a flexible substrate 10, and an auxiliary yoke 11 all fixed with adhesive. The auxiliary yoke 11 is mounted on the base plate 1.

The rotating shaft 4 is rotatably fixed to two pairs of ball bearings 12. These ball bearings 12 are built into a bracket 13. The bearing 3 is fixed to the bracket 13 with adhesive. The bracket 13 is mounted on the base plate 1. The rotating shaft 4 is designed so as not to be removed.

In further detail, the rotor 5 is provided with the hub 7 into which the field magnet 8 is pressed. The hub 7 is provided with a guide section 7f and a plurality of protrusions 7g. The guide 7f has a diameter slightly larger than the field magnet 8. The protrusion 7g can be easily transformed elastically against holding section 7a. The rotor yoke 6 is provided with a recessed section 6b on a surface opposite the plane near the outside periphery of the field magnet 8. A magnetic circular wall 6c is provided on the outside periphery of the rotor yoke 6. The magnetic circular wall 6c has a diameter slightly larger than the outside diameter of the field magnet 8 and is provided so as to surround and fasten the outside periphery of the holding section 7a.

Rigidity is ensured for a press fit section between the rotor yoke 6 and the rotating shaft 4 by using metallic magnetic substance for the rotor yoke 6. It is possible to shorten the length of the press fit section.

The rotor is integrally formed of the resin and the magnetic substance. This rotor is only the part used between the rotating shaft 4 and the field magnet 8, preventing the eccentricity accuracy from deteriorating due to accumulated parts inaccuracies.

This commonly brittle field magnet 8 is pressed into a plurality of holding sections 7a by using elastically deformable resin. This eliminates an accidental break such as cutout. This structure does not need a gap in the radial direction between the field magnet 8 and the rotor hub 7. It is possible to greatly suppress a decrease in the eccentricity accuracy of the field magnet 8 with reference to the rotating shaft 4. Conventionally, such a decrease in the eccentricity accuracy often occurs during assembly.

An integration of the hub 7 and the rotor yoke 6 are the only parts arranged between the rotating shaft 4 and the field magnet 8. As a mold for forming this part, the holding section 7a is processed and fabricated to align with the holes of the rotor yoke 6 for press-fitting the rotating shaft 4. It is easy to ensure a high level of eccentricity accuracy for the field magnet 8 with reference to the rotating shaft 4.

The rotor yoke 6 and the field magnet 8 cause a suction force in the axial direction. Pressing the field magnet 8 into the hub 7 causes a fixing force in the radial direction. These forces increase a holding strength of the field magnet 8, substantially avoiding misalignment after assembly. It is also possible to eliminate a conventional adhesion process.

When the field magnet 8 is pressed, a press fit overlap width for the holding section 7a is partially deformed in the pressing direction. In order to prevent the deformed portion from being caught between facing surfaces of the rotor 5 and the field magnet 8, the rotor yoke 6 is provided with the recessed section 6b for releasing the deformed resin of the holding section 7a. It is possible for the rotor 5 to reliably contact the field magnet 8. Accordingly, this stabilizes a fixing force between the rotor 5 and the field magnet 8 and maintains a constant distance between the field magnet 8 and the coil 9. No fluctuation occurs in the magnetic flux supplied to the coil 9. As a result, the vibration noise can be decreased.

The magnetic circular wall 6c prevents the magnetic flux of the field magnet 8 from leaking toward the outside periphery. The diameter of this wall is slightly larger than that of the field magnet 8. There is a difference between the inside diameter of the magnetic circular wall 6c and the outside diameter of the field magnet 8. This difference can be approximately 0.3 mm by means of resin formation. The magnetic circular wall 6c can have a smaller diameter compared to press working according to the prior art. Further, the resin material used has a smaller specific gravity than metal, therefore the size to weight ratio can be improved. Moreover, the eccentricity accuracy is good. As a combined effect, it is possible to easily prevent a rotor balance from degrading.

Figure 3:
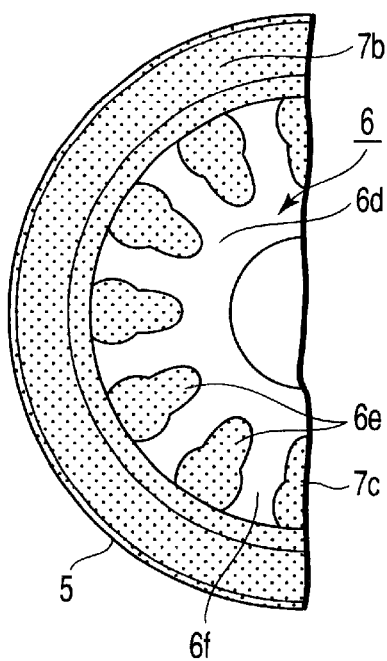
FIG. 3 is a top-down plan view showing the shape of a rotor for this spindle motor.
Figure 4:
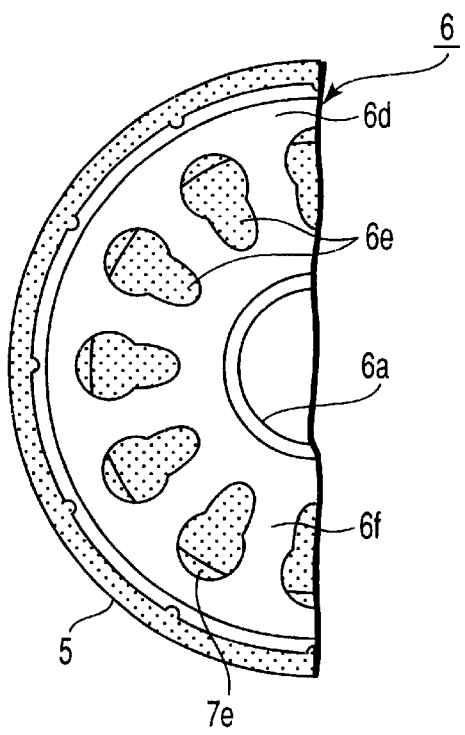
FIG. 4 is a bottom-up plan view showing the shape of this rotor.

Here, FIGS. 3 and 4 are referred to. FIG. 3 shows a top-down plan view of the rotor 5 according to the first embodiment. FIG. 4 shows a bottom-up plan view of this rotor 5.

Like the structure in FIG. 2, the hub 7 is resin-formed together with the rotor yoke 6 of the rotor 5 as shown in FIGS. 3 and 4. On this hub 7, there are formed a mounting surface 7b for an object to be driven such as a disk (not shown) and a recessed section 7c for axially supporting the disk. A disk guide section 4a in the radial direction is provided on the top of the rotating shaft 4 in the recessed section for supporting the radial direction.

A plane 6d of the rotor yoke 6 has as many holes 6e as magnetic poles of the field magnet 8. Each hole is filled with nonmagnetic resin of the hub 7. A spoke section 6f connects the magnetic circular wall 6c and the fixing section 6a.

A magnetic circuit comprises the field magnet 8, holes 6e, the spoke section 6f, and a disk-side yoke (not shown). The disk is fixed onto the disk mounting surface 7b by suction.

The thus configured spindle motor provides the following effects. The disk mounting surface 7b is resin-formed integrally with the rotor yoke 6. A large fixing force works between the rotor yoke 6 and the hub 7. Since the cutting resistance of the resin is small, unfavorable chatter marks etc. do not occur when the mounting surface is cut, improving the accuracy.

Since the resin is characterized by a small cutting resistance, a small stress is applied to the press fit section between the rotating shaft 4 and the rotor yoke 6 when the mounting surface is processed. It is also possible to shorten the length of the press fit portion. As a result, the motor can have a low profile.

The disk mounting surface 7b is resin formed integrally with the rotor yoke 6. The rotating shaft 4 fits in the rotor's recessed section or just slightly deviates from the same, thus thinning the motor itself.

The hub 7 including the disk mounting surface 7b is formed of resin whose specific gravity is approximately a half or less than metal. For example, the specific gravity of aluminum is 2.7. The specific gravity of polyacetal is 1.4. Accordingly, the portion formed of resin is light-weight. If a slight eccentricity exists, the rotor is well balanced, reducing the vibration noise.

Figure 5:
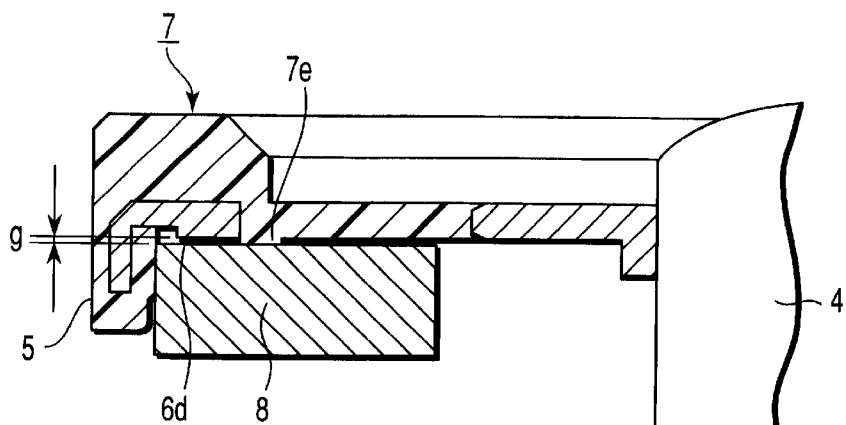
FIG. 5 is a vertical sectional view showing the rotor, a field magnet, and a rotating shaft.

FIG. 5 shows a cross section of the rotor 5, the field magnet 8, and the rotating shaft 4.

In FIGS. 1, 4, and 5, the hub 7 is partially placed between the rotor yoke 6 and the field magnet 8. The rotor 5 is provided so that many ribs 7e are radially formed on the hub 7 in order to provide a small gap g between the rotor yoke plane 6d and the field magnet 8.

The resin material is used for the hub 7 between the field magnet 8 and the rotor yoke 6. The vibration transmissibility of this resin material is much less than that of the magnet or the magnetic substance. An area of the rib 7e as a vibration transmission surface is reduced because the rib 7e is divided into the same number of portions as holes 6e. Further, the characteristic frequency greatly differs from that for the prior art. A vibration occurs due to irregular drive torque between the stator 2 and the field magnet 8. The vibration is transmitted from the field magnet 8 via the rib 7e, the rotor yoke 6, the rotating shaft 4, etc., then to the base plate 1 with a greatly reduced magnitude. Since the resonance is suppressed for the rotor including the field magnet 8, vibration nose is decreased. Similarly, the vibration transmission or resonance applied to the disk or the polygon mirror is also suppressed.

(Second Embodiment)

Figure 6:
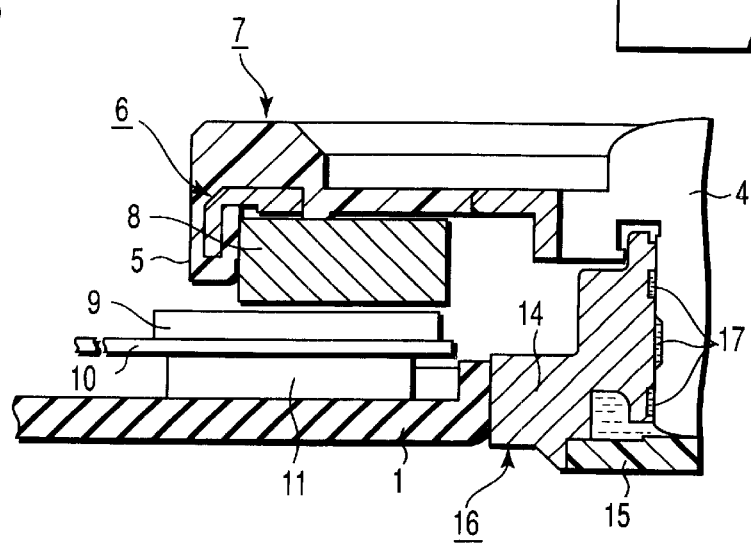
FIG. 6 is a vertical sectional view showing a configuration of the spindle motor as a second embodiment of the present invention.

The second embodiment of the present invention is described with reference to FIG. 6. The mutually corresponding parts in FIG. 1 are designated by the same reference numerals and a description thereof is omitted here. FIG. 6 shows a sectional view of the entire spindle motor as the second embodiment. This spindle motor is an example having a dynamic pressure bearing 16 as a bearing member.

The dynamic pressure bearing is also called a "hydraulic bearing". The dynamic pressure bearing mainly comprises a shaft and a sleeve rotatably supporting this shaft. The surface of the shaft or the sleeve is provided with a groove for generating a dynamic pressure to move fluid (oil, etc.) as lubricant. FIG. 6 is used to mainly explain constituent components which differ from the first embodiment. A spindle motor shaft, namely the rotating shaft 4, is rotatably supported by a sleeve 14 mounted on the base plate 1. In more detail, the rotating shaft 4 is supported by a thrust pad 15 and is inserted at the bottom end in the axial direction so as to maintain a point contact. An inner wall surface of the sleeve 14 is provided with a plurality of thin dynamic pressure grooves with a specified shape.

An aperture is formed on the bottom surface of the sleeve 14 for the dynamic pressure bearing 16. The thrust pad 15 is engaged into the aperture and is fixed by bonding. One end of the sleeve is sealed in the axial direction. With this state, lubricating oil 17 such as oil, etc. having specified characteristics is injected into a space formed between the rotating shaft 4, the sleeve 14, and the thrust pad 15.

The spindle motor having the thus configured dynamic pressure bearing provides the following effects.

The rotating shaft 4 is rotatably supported by the sleeve 14 and axially supported by the thrust pad 15. The thrust pad 15 is fixed to the rotating shaft 4 and the sleeve 14. The sleeve of the dynamic pressure bearing 16 is sealed at one end in an axial direction. In the dynamic pressure bearing 16, the lubricating oil 17 is injected throughout a space formed between the rotating shaft 4, the sleeve 14, and the thrust pad 15. The magnetic flux generated between the field magnet 8 and the stator 2 allows the rotor 5 to revolve the rotating shaft 4 by forcing the thrust pad 15 from the top. In this case, it is possible to maintain a smooth rotation with greatly decreased friction through the intermediary member of the lubricating oil 17.

During assembly or operation, due to the shock of being dropped, etc, the rotor 5 transmits this shock to the base plate 1. Also in this case, the magnetic flux generated between the field magnet 8 and the auxiliary yoke 11 supplies a force larger than a dropping force generated in proportion to the weight of the rotor 5 and the rotating shaft 4. The rotor 5 and the rotating shaft 4 are axially forced against the thrust pad 15. Further, one end of the dynamic pressure bearing 16 is sealed. The lubricating oil 17 injected in the dynamic pressure bearing 16 has viscosity. These factors generate an action against disengagement of the rotating shaft 4. Consequently, the dynamic pressure bearing 16 prevents the rotating shaft 4 from being removed. Therefore, there is no need to provide special means for preventing the rotating shaft 4 from being disengaged. The number of parts is small because only the rotating shaft 4 is fitted into the sleeve. This decreases the number of assembly steps. It is therefore possible to provide a low cost solution for prevention of disengagement.

The hub 7 is formed of resin with a small specific gravity compared to the field magnet 8 or the rotor yoke 6 which is made of metal or metallic material, enabling a light weight structure. A generated dropping force is small compared to the weight.

(Third Embodiment)

Figure 7:
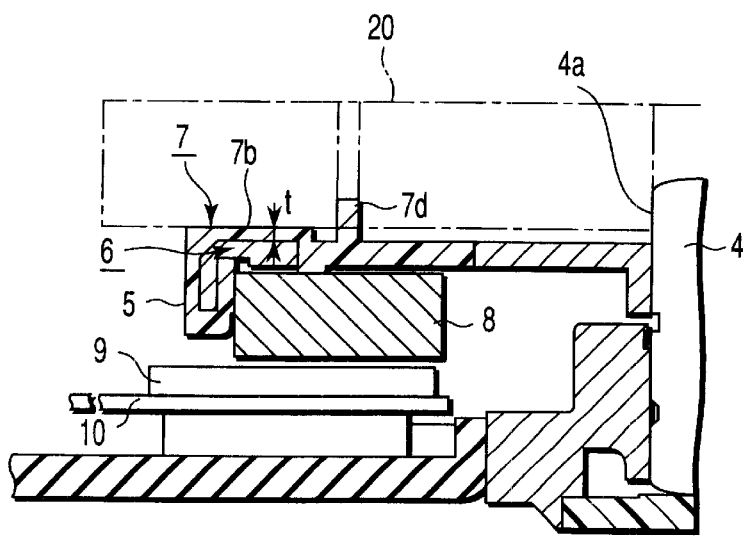
FIG. 7 is a vertical sectional view showing a configuration of the spindle motor as a third embodiment of the present invention.

The third embodiment of the present invention is described with reference to FIG. 7. The mutually corresponding parts in the first and second embodiments are designated by the same reference numerals and a detailed description thereof is omitted here. FIG. 7 is a sectional view showing a configuration of the entire spindle motor equipped with a polygon mirror 20 to be driven rotatably. The following describes the configuration and installation of the spindle motor by using the polygon mirror as an example of an object to be driven rotatably. The hub 7 is resin formed integrally with the rotor yoke 6 of the rotor 5. On the hub 7, for example, there are formed the mounting surface 7b for placing the polygon mirror and a "slotted" positioning pin 7d. The mounting surface 7b is resin formed integrally with the rotor yoke 6.

In more detail, the hub 7 including the mounting surface 7b is formed of resin, such as polyacetal, with the specific gravity of approximately 1.4. The hub 7 is configured to be mounted so that a circumferential direction is positioned by supporting and fixing the rotating shaft 4. The top of the rotating shaft 4 is provided with the guide section 4a of the polygon mirror 20. The radial direction is supported by fitting the polygon mirror 20 to the guide section 4a of the rotating shaft 4.

An object to be driven rotatably may be a magnetic disk, an optical disk, etc. which is rotated at high speed by the rotating shaft 4.

The thus-configured spindle motor provides the following effects. Since the mounting surface 7b of the polygon mirror 20 is resin formed integrally with the rotor yoke 6, the rotor yoke 6 and the hub 7 generate a large fixing force and the resin provides a small cutting resistance. Accordingly, the processing accuracy can be improved by preventing undesirable chatter marks etc. from occurring when the mounting surface 6b is cut. The resin provides a small cutting resistance, decreasing a force applied to the press fit section between the rotating shaft 4 and the rotor yoke 6. It is also possible to shorten the length of the press fit portion. As a result, the motor itself can have a low profile.

The mounting surface 7b is resin formed integrally with the rotor yoke 6, decreasing a thickness t of the top of the rotor yoke 6. As a result, the motor itself has a low profile. The hub 7 including the mounting surface 7b for the polygon mirror 20 is formed of resin whose specific gravity is approximately a half of metal. For example, the specific gravity of aluminum is 2.7. The specific gravity of polyacetal is 1.4. Accordingly, the portions formed of resin such as polyacetal are light-weight. If a slight eccentricity exists due to processing or mounting inaccuracies, the rotor is well balanced because of the light weight parts, reducing vibration noise.

(Modification)

The resin material is not limited to polyacetal. Other materials may be used if they have similar properties. Modification of shapes may be incorporated for effectively demonstrating working effects of a given material and is considered to belong to design matters. Based on this premise, it may be preferable to modify shapes and dimensions of associated elements.

Furthermore, the present invention may be embodied in various modifications without departing from the spirit and scope of the invention.

While there have been described specific preferred embodiments of the present invention, this specification includes the following inventions.

The rotor is integrally formed of the resin and the magnetic substance and constitutes the only intermediate part between the rotating shaft and the field magnet. It is possible to provide a spindle motor which prevents deterioration of the eccentricity accuracy.

The breakable field magnet is pressed into the holding section using elastic resin. This prevents the brittle field magnet from being damaged. No gap is needed between the field magnet and the rotor yoke, allowing precision assembly and providing a spindle motor having small eccentricity.

The material used is resin having a smaller specific gravity than metal. This decreases the weight and improves the eccentricity accuracy, providing a spindle motor capable of preventing degradation of a rotor balance.

The field magnet's holding strength is increased with an axial suction force of the rotor yoke and the field magnet and a radial fixing force caused by pressing the field magnet into the resin section. This can provide a spindle motor which is free from misalignment after assembly and eliminates the need for an adhesion process.

If the rotor is dropped, and a shock is transmitted to the base plate, a dropping force in proportion to the weight of the rotor and the rotating shaft causes a magnetic flux to be generated between the rotating shaft, the field magnet, and the auxiliary yoke. The magnetic flux produced cages the rotating shaft to be axially propelled against the thrust pad. Thus, it is possible to provide a low cost spindle motor capable of preventing the rotor from being disengaged.

The mounting surface of a disk or a polygon mirror is resin formed integrally with the rotor yoke. The rotor yoke and the resin section provides a large fixing force. The resin is characterized by a small cutting resistance. When the mounting surface is processed, undesirable chatter marks etc. do not occur, providing a spindle motor with improved accuracy.

The mounting surface of a disk or a polygon mirror is resin formed integrally with the rotor yoke. It is possible to thin the top of the rotor yoke, providing a low-profile spindle motor.

The disk or polygon mirror mounting surface, the field magnet holding section, etc. are formed of resin whose specific gravity is smaller than metal. The resin-formed portions are lightweight. If eccentricity exists, the rotor balance is good, providing a spindle motor with low vibration noise.

The resin material is used between the field magnet and the rotor, therefore the vibration transmissibility of this resin material is much less than that of the magnet or the magnetic substance. Further, resonant characteristic frequencies differ remarkably. This decreases vibrations generated by irregular drive torque between the stator and the field magnet and also decreases vibrations transmitted from the field magnet to the rotor. It is possible to suppress resonance of the rotor including the field magnet, providing a spindle motor capable of decreasing vibrational noise.

As mentioned above, the present invention can provide a spindle motor which enables an improved accuracy in the mounting and positioning of the field magnet on the rotor. As a consequence, the present invention also provides a low-profile motor and decreases costs.

A spindle motor has a stator, a bearing, a rotating shaft, a rotor, and a field magnet. The stator is mounted on a base plate (base). The bearing is provided at a specified position, e.g. near the center, of this base plate. The rotating shaft is rotatably provided on this bearing. The rotor is fixed to this rotating shaft. The field magnet is fixed to this rotor. The present invention proposes the spindle motor having the following configuration. The rotor uses a metallic magnetic substance and resin as materials. The rotor is fixed to the rotating shaft at that magnetic substance section. A resin section is formed integrally with the magnetic substance section. A holding section is provided so that the field magnet is pressed into and fixed to part of the resin section. Press fitting to this holding section fixes the field magnet and the rotor. The field magnet and the rotor yoke are assembled without the need for a gap therebetween. Deterioration of a rotor balance is prevented by improving the mounting accuracy, reducing the rotor eccentricity, and promoting a light-weight design. Further, a large holding strength applied to the field magnet prevents misalignment from occurring.

The present invention proposes the above-mentioned spindle motor which is rotatably supported by a sleeve mounted on the base plate (base). A thrust pad axially supports the rotating shaft. The thrust pad is fixed to the rotating shaft and the sleeve. There is provided an auxiliary yoke mounted on the base plate. The rotating shaft is forced against the thrust pad in the axial direction to prevent the rotor from being disengaged, using the force caused by the magnetic flux generated between the rotating shaft, the field magnet, and the auxiliary yoke.

Further, the present invention proposes the above-mentioned spindle motor in which the resin section is formed integrally with the rotor's magnetic substance and a mounting surface for a disk or a polygon mirror is formed on this resin section. The mounting surface exhibits a large fixing force due to integral formation of the rotor yoke and the resin. A small cutting resistance of the resin improves the processing accuracy.

Moreover, the present invention proposes the above-mentioned spindle motor in which a resin section is arranged between the magnetic substance and the field magnet. The resin section is provided with a rotor forming ribs so that a slight gap is maintained between the magnetic substance plane and the resin section.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A spindle motor comprising:

a base plate;

a stator mounted on said base plate;

a bearing provided on said base plate;

a rotating shaft rotatably provided on said bearing;

a rotor fixed to said rotating shaft, wherein said rotor is formed of a metallic magnetic substance section and a resin section and is fixed to said rotating shaft at the magnetic substance section; and a field magnet fixed to said rotor, wherein said field magnet is pressed into and fixed to said rotor at the resin section of said rotor.

2. The spindle motor according to claim 1, wherein said bearing is a dynamic pressure bearing.

3. The spindle motor according to claim 2, wherein said bearing includes a sleeve and a thrust pad.

4. The spindle motor according to claim 3, wherein said stator includes an auxiliary yoke.

5. The spindle motor according to claim 1, wherein said rotor includes a mounting surface for mounting a disk or a polygon mirror at a resin section.

6. The spindle motor according to claim 1, wherein said rotor includes a rib formed of said resin; and said field magnet touches said rib and forms a gap with a specified distance.

7. The spindle motor according to claim 1, wherein said resin section is placed between said magnetic substance and said field magnet; and said resin section is provided with said rotor forming ribs so that a specified gap is provided between a plane of said field magnet and said resin section.

* * * * *